May 18, 1937.  W. SHAKESPEARE, JR  2,080,900

FISHING REEL

Filed May 9, 1936

INVENTOR.
William Shakespeare Jr.
BY Chappell, Earl & Chappell
ATTORNEYS

Patented May 18, 1937

2,080,900

UNITED STATES PATENT OFFICE 2,080,900

FISHING REEL

William Shakespeare, Jr., Kalamazoo, Mich., assignor to Shakespeare Company, Kalamazoo, Mich.

Application May 9, 1936, Serial No. 78,746

8 Claims. (Cl. 242—84.5)

This invention relates to improvements in fishing reels.

The main objects of this invention are:

First, to provide in a fishing reel an improved drag or brake means which has a wide range of adjustment and is easily adjusted for any degree of braking action from its maximum to its minimum.

Second, to provide a drag or brake which is very efficient, having the advantages above stated and at the same time one which is simple and economical in its parts and in which the parts are so arranged that the strain and wear is minimized.

Third, to provide a fishing reel brake means which does not tend to distort or displace moving parts such as results where the brake is applied to the spool as is quite common practice in the art.

Objects pertaining to details and economies of my invention will definitely appear from the description to follow. The invention is defined in the claims.

A device which embodies the features of my invention is clearly illustrated in the accompanying drawing, in which.

Figure 1:
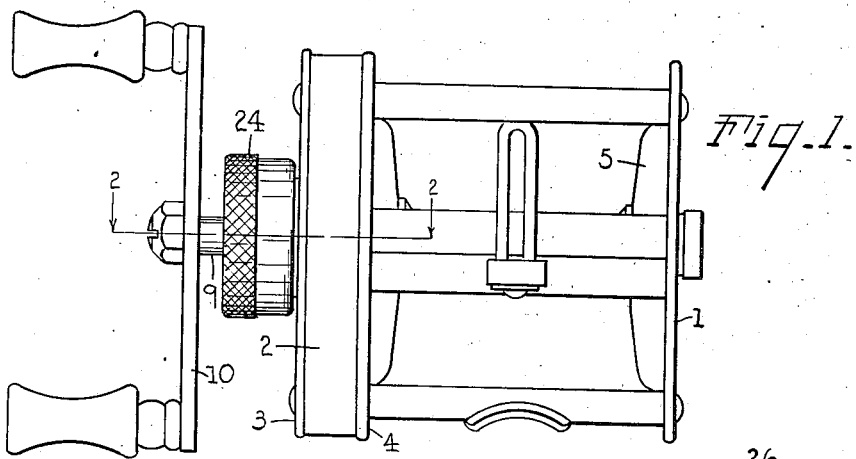
Fig. 1 is a front elevation of a fishing reel embodying the features of my invention.
Figures 2, 3:
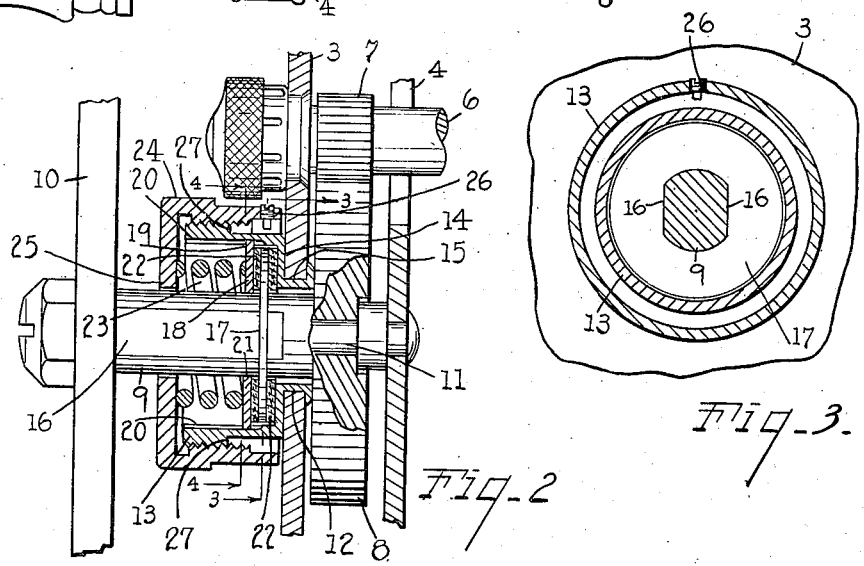
Fig. 2 is an enlarged fragmentary view partially in section on line corresponding to line 2—2 of Fig. 1.
Fig. 3 is a fragmentary section on line 3—3 of Fig. 2.
Figure 4:
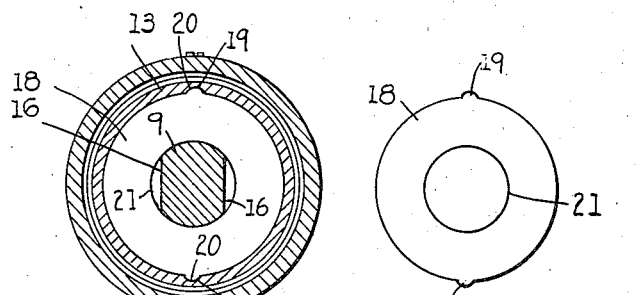
Fig. 4 is a detail section on line 4—4 of Fig. 2.
Figure 5:
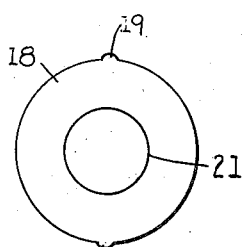
Fig. 5 is a side view of one of the brake disks.

In the embodiment of the invention illustrated I designates the fishing reel frame which is provided with a chambered head 2 comprising outer wall 3 and inner wall 4. The spool 5 is provided with a shaft 6 having a pinion 7 meshing with the gear 8 on the driving shaft 9 which is provided with a crank 10. The driving shaft is supported by the spindle 11 mounted on the inner wall 4.

The inner wall of the head 2 is provided with an opening 12 in which the collar 13 is mounted concentric of the shaft 9. This collar is of general cup shape providing an inner wall 14 having a flange 15 secured in the opening 12. The shaft 9 has flattened sides 16 which serve as splines engaging the brake disk 17 so that it is axially movable on the shaft but is rotatable therewith. The coacting brake disk 18 is provided with tongues or feathers 19 engaging longitudinal grooves 20 in the collar so that this disk is splined to the collar. The opening 21 of this disk is round so that the shaft may rotate within the disk.

Friction members 22 of fiber or other suitable facing material are arranged between the two disks and between the inner disk 17 and the end wall of the collar so that when pressure is applied to the disk by means of the coiled spring 23 a braking action on the shaft results, owing to the disk 18 being non-rotatably secured and the coacting disk 17 being secured to the shaft to rotate therewith.

The tension of the spring or the braking action is varied by means of the adjusting member 24 threaded upon the collar, this being cup-shaped to provide an outer wall 25 supporting the outer end of the spring. A stop 26 is provided on the adjusting member to coact with the shoulder-like stop 27 on the collar, thereby allowing a very wide range of adjustment of spring tension and consequently of the braking action.

The adjusting member is preferably knurled for convenience in grasping and is arranged on the inside of the crank so that it is conveniently positioned for manipulation and does not form an objectionable projection on the frame.

With this arrangement of parts the braking stress is carried by substantial parts and is sustained directly by the frame. This is of very decided advantage as the bearing parts are not subjected to strain and there is no tendency to distort or place undue stress on the spool bearings.

I have illustrated and described my improvements in an embodiment which I have found very satisfactory. I have not attempted to illustrate or describe certain other embodiments or adaptations which I contemplate as it is believed this disclosure will enable those skilled in the art to embody or adapt my invention as may be desired.

Having thus described my invention what I claim as new and desire to secure by Letters Patent is:

1. In a fishing reel, the combination with a frame including a chambered head having an opening in its outer wall, of a spool, a crank provided with a shaft disposed through said opening and having driving connection with said spool, a supporting spindle for said shaft on the inner wall of said head, an outwardly projecting cup-shaped collar mounted in said opening in said outer wall, a brake disk splined to said shaft, a brake disk splined to said collar, friction means interposed between said brake disks and between the brake disk splined to said shaft and the inner end of said collar, a cup-shaped adjusting member threaded upon said collar and having an opening receiving said shaft, a spring interposed between the end of said adjusting member and said brake disk splined to said collar, and a stop limiting the rotative movement of said adjusting member.

2. In a fishing reel, the combination with a frame including a chambered head having an opening in its outer wall, a spool, a crank provided with a shaft disposed through said opening and having driving connection with said spool, a supporting spindle for said shaft on the inner wall of said head, an outwardly projecting collar mounted in said opening in said outer wall, a brake disk splined to said shaft, a brake disk splined to said collar, friction means interposed between said brake disks and between the brake disk splined to said shaft and the said collar, an adjusting member threaded upon said collar and having an opening receiving said shaft, and a spring interposed between the said adjusting member and said brake disk splined to said collar.

3. In a fishing reel, the combination with a frame including a chambered head having an opening in its outer wall, a spool, a crank provided with a shaft disposed through said opening and having driving connection with said spool, a supporting spindle for said shaft on the inner wall of said head, an outwardly projecting collar mounted in said opening in said outer wall, a brake disk splined to said shaft, a coacting brake disk splined to said collar, an adjusting member threaded for adjustment, and a spring interposed between the said adjusting member and said brake disk splined to said collar.

4. In a fishing reel, the combination with a frame, a spool, a driving shaft having driving connection with said spool, a collar mounted on said frame concentric with said shaft, a brake disk splined to said shaft, a brake disk splined to said collar, friction elements interposed between said brake disks and between the brake disk splined to said shaft and said collar, a cup-shaped adjusting member threaded upon said collar and having an opening receiving said shaft, and a spring interposed between the end of said adjusting member and said brake disk splined to said collar.

5. In a fishing reel, the combination with a frame, a spool, a driving shaft having driving connection with said spool, a collar mounted on said frame concentric with said shaft, a brake disk splined to said shaft, a brake disk splined to said collar and coacting with said first brake disk, an adjusting member mounted for adjustment relative to said collar, and a spring interposed between said adjusting member and said brake disks.

6. In a fishing reel, the combination with a frame, a spool, a driving shaft having driving connection with said spool, a collar mounted on said frame concentric with said shaft, a brake disk mounted for rotation with said shaft, a brake disk splined to said collar coacting with said first brake disk, an adjusting member threaded for adjustment relative to said collar, and a spring interposed between said adjusting member and one of said brake disks.

7. In a fishing reel, the combination with a frame, a spool, a driving shaft having driving connection with said spool, a collar mounted on said frame, coacting brake disks one of which is splined to said shaft and the other to said collar, a cup-shaped brake adjusting member threaded upon said collar, a spring interposed between the outer end of said adjusting member and the outer of said brake disks, and a stop limiting the rotative movement of said adjusting member.

8. In a fishing reel, the combination with a frame, a spool, a driving shaft having driving connection with said spool, a collar mounted on said frame, coacting brake disks one of which is splined to said shaft and the other to said collar, a brake adjusting member adjustably mounted on said collar, and a spring interposed between said adjusting member and said brake disks.

WILLIAM SHAKESPEARE, Jr.